United States Patent [19]
Chapman

[11] Patent Number: 5,269,654
[45] Date of Patent: Dec. 14, 1993

[54] TAIL ROTOR ASSEMBLY FOR HELICOPTERS

[76] Inventor: Don Chapman, 6225 Taylorsville Rd., Dayton, Ohio 45424

[21] Appl. No.: 919,208

[22] Filed: Jul. 24, 1992

[51] Int. Cl.$^5$ ............................ B63H 5/08; B63H 5/10
[52] U.S. Cl. .................................... 416/120; 416/124; 244/17.19; 244/17.21
[58] Field of Search ...................... 416/120, 124, 126; 244/17.19, 17.11, 17.21, 17.15

[56] References Cited

U.S. PATENT DOCUMENTS 2,514,205  7/1950  McDonald .................. 244/17.21 X
2,514,206  7/1950  Perry ............................ 244/17.21 X

FOREIGN PATENT DOCUMENTS 125005  10/1945  Australia ........................ 244/17.19
137048   3/1947  Australia ........................ 244/17.19

Primary Examiner—Edward K. Look
Assistant Examiner—Mark Sgantzos
Attorney, Agent, or Firm—John H. Crozier

[57] ABSTRACT

In a preferred embodiment, a tail rotor assembly for a helicopter, which includes: a first rotor disposed on a first side of the distal end of a tail boom of the helicopter and rotatable in a first geometric plane; and a second rotor disposed on a second side of the distal end of the tail boom, the second rotor being rotatable in a second geometric plane.

8 Claims, 3 Drawing Sheets

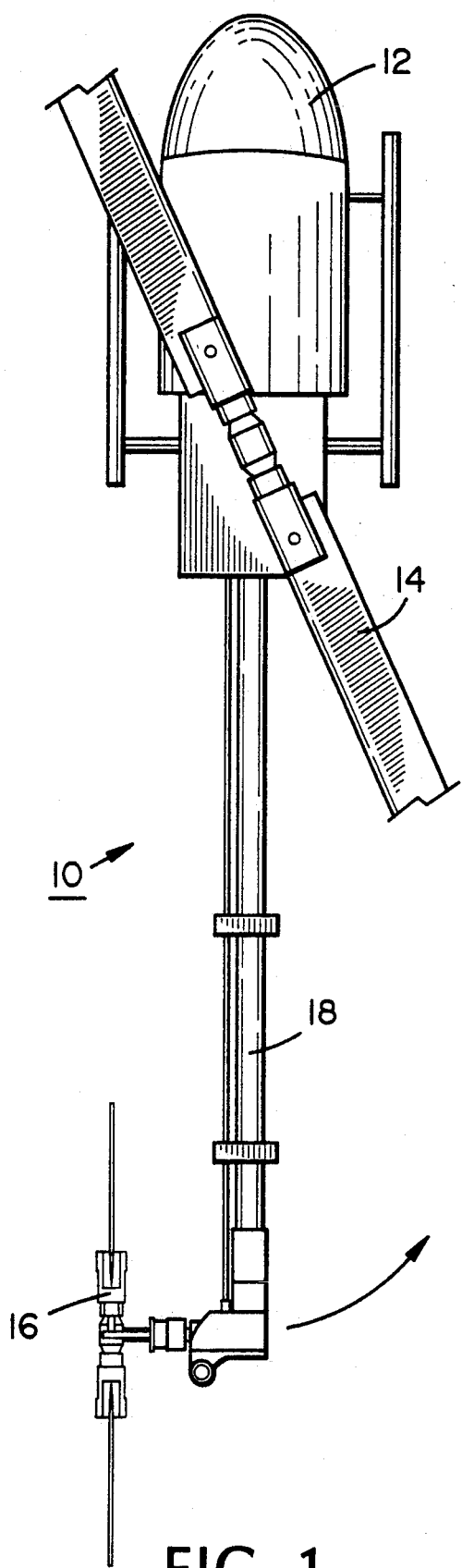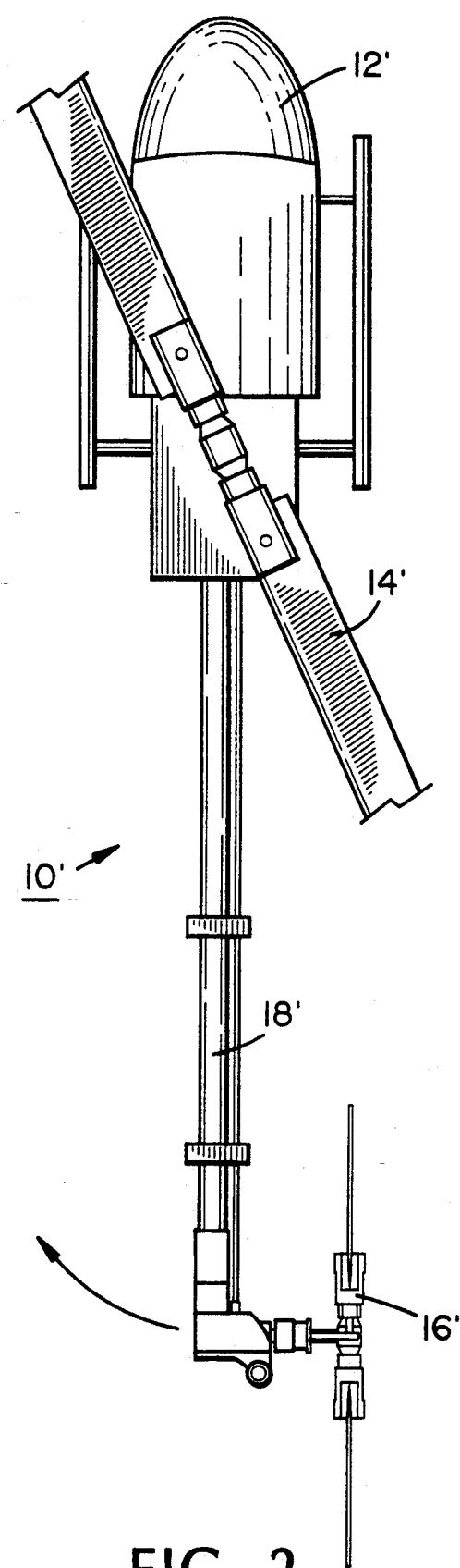
FIG. 1
(PRIOR ART)
FIG. 2
(PRIOR ART)

TAIL ROTOR ASSEMBLY FOR HELICOPTERS

BACKGROUND OF THE INVENTION

1. Field of the Invention

The present invention relates to helicopters generally and, more particularly, but not by way of limitation, to a novel tail rotor assembly for helicopters which provides substantially improved performance over conventional tail rotors.

2. Background Art

Although there are some alternative designs, helicopters are conventionally constructed with a single main rotor blade. A condition associated with the single main rotor arrangement is that the main rotor generates a horizontal torque component which must be offset. To accomplish this, conventional helicopters, both model and full-scale, employ a single vertical tail rotor mounted on either the left or the right side of the distal end of the tail boom. A tail rotor is generally considered to be the weakest feature of a conventional helicopter in terms of control and performance.

When the helicopter is trimmed for "hands off" hover in forward flight, the tail rotor creates an asymmetrical drag. If the tail rotor is mounted on the left side of the tail boom, the drag causes a left yaw condition which tends to rotate the helicopter counterclockwise. If the tail rotor is mounted on the right side of the tail, a right yaw condition exists.

Also, in forward flight, as air speed changes, if there has been a trim adjustment of the tail rotor for a left or right yaw condition at one speed, the required trim adjustment changes as forward speed changes. Similar adjustments are required for changes in wind velocity and direction to maintain stability of the helicopter.

Most modern helicopters use a vertical fin to augment the directional stability of the tail rotor and, for greatest effectiveness, these two components should both be located at the end of the tail boom. Both near and far relative locations of these two components have disadvantages, so the final design must be a compromise. Additionally, since the rotor will either blow air at the fin or suck air past it, there is a resultant power penalty.

A further problem with conventional tail rotors, particularly with smaller helicopters, is that the rotor presents a safety problem to personnel on the ground and also presents a ground clearance problem. Ground clearance is particularly a problem when landing on unprepared ground, since the usual rotational direction of the top blade on the tail rotor going back can cause the rotor to bat rocks at the fuselage.

Accordingly, it is a principal object of the present invention to provide a tail rotor assembly for a helicopter that eliminates undesired yaw conditions.

It is a further object of the invention to provide such a tail rotor that permits improved control of the helicopter in a variety of conditions.

It is an additional object of the invention to provide such a tail rotor that reduces personnel safety and ground clearance problems.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a tail rotor assembly for a helicopter, comprising: a first rotor disposed on a first side of the distal end of a tail boom of said helicopter and rotatable in a first geometric plane; and a second rotor disposed on a second side of the distal end of said tail boom, said second rotor being rotatable in a second geometric plane.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 1 is a top plan view of a helicopter with one type of conventional tail rotor.

FIG. 2 is a top plan view of a helicopter with another type of conventional tail rotor.

DETAILED DESCRIPTION OF THE PREFERRED EMBODIMENTS

Figure 3:
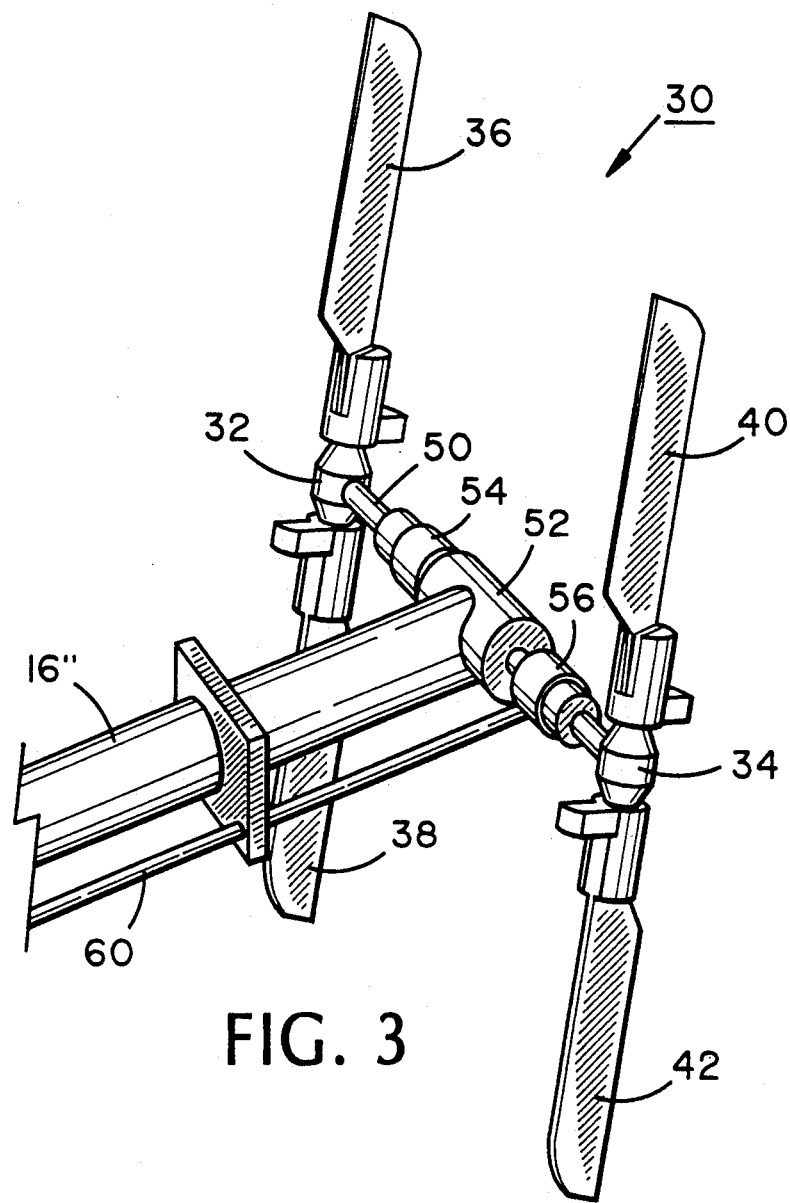
FIG. 3 is a fragmentary perspective view of a helicopter having tail rotor assembly constructed according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates one configuration of a conventional helicopter, generally indicated by the reference numeral 10. Helicopter 10 includes a fuselage 12, a main rotor 14, and a single tail rotor 16 mounted on the left side of the distal end of a tail boom 18. As noted above, having tail rotor 16 so mounted causes a left yaw condition as indicated by the arrow on FIG. 1.

FIG. 2 illustrates another configuration of a conventional helicopter, generally indicated by the reference numeral 10'. Helicopter 10' includes a fuselage 12', a main rotor 14', and a single tail rotor 16' mounted on the right side of the distal end of a tail boom 18'. Also, as noted above, having tail rotor 16' so mounted causes a right yaw condition as indicated by the arrow on FIG. 2.

FIG. 3 illustrates a tail rotor assembly according to the present invention, generally indicated by the reference numeral 30, mounted at the end of a tail boom 16" of an otherwise conventionally constructed helicopter (other elements not shown). Rotor assembly 30 includes identical vertical twin rotors 32 and 34 disposed on either side of tail boom 16". Rotors 32 and 34 have identical blade pairs 36/38 and 40/42, respectively. It should be noted that rotors 32 and 34 need not be identical and may have different diameters and/or areas, and such is within the intent of the present invention. Rotors 32 and 34 are fixedly mounted at the distal ends of a rotatable shaft 50 which operatively extends through a gear box 52. Pitch changing mechanisms 54 and 56 (not completely shown on FIG. 3) are operatively connected between gear box 52 and rotors 32 and 34, respectively. It can be seen that rotors 32 and 34 are parallel and will rotate together in the same direction.

Figure 4:
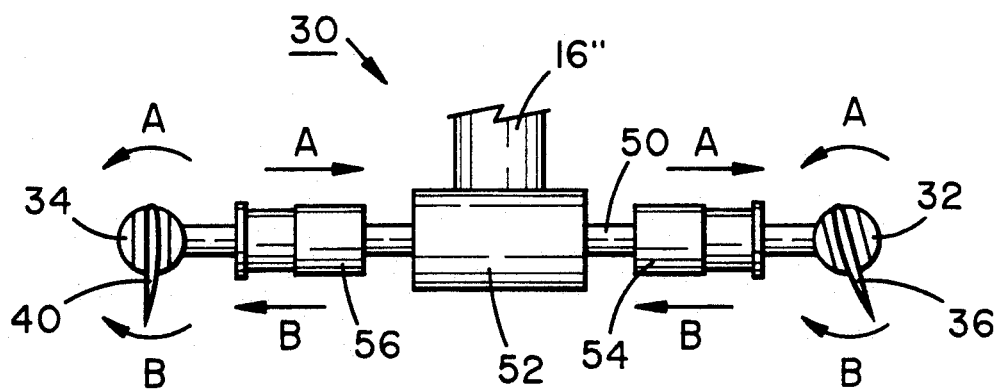
FIG. 4 is an schematic top plan view showing the pitch adjustment arrangement of the tail rotor assembly of the present invention.

FIG. 4 illustrates the pitch adjustment of rotors 32 and 34. It can be seen from FIG. 4 that the pitches of rotor blades 36 and 40 are not equal; that is, when rotor blade 40 has a neutral pitch, as shown, rotor blade 36 has a positive pitch. Pitch changing mechanisms 54 and 56 are so arranged that they are journalled on shaft 50 so as to move axially together back and forth along the shaft to change the pitches of rotors 32 and 34 in unison. Accordingly, when pitch changing mechanisms 54 and 56 move in the direction of the straight arrows "A", causing rotor blades 32 and 34 to rotate in the direction of the curved arrows "A". Such rotation will increase the pitch of rotor blade 36, while giving rotor blade 40 some pitch in the same direction. Likewise, when pitch changing mechanisms 54 and 56 move in the direction of the straight arrows "B", the opposite effect will be obtained.

Figure 5:
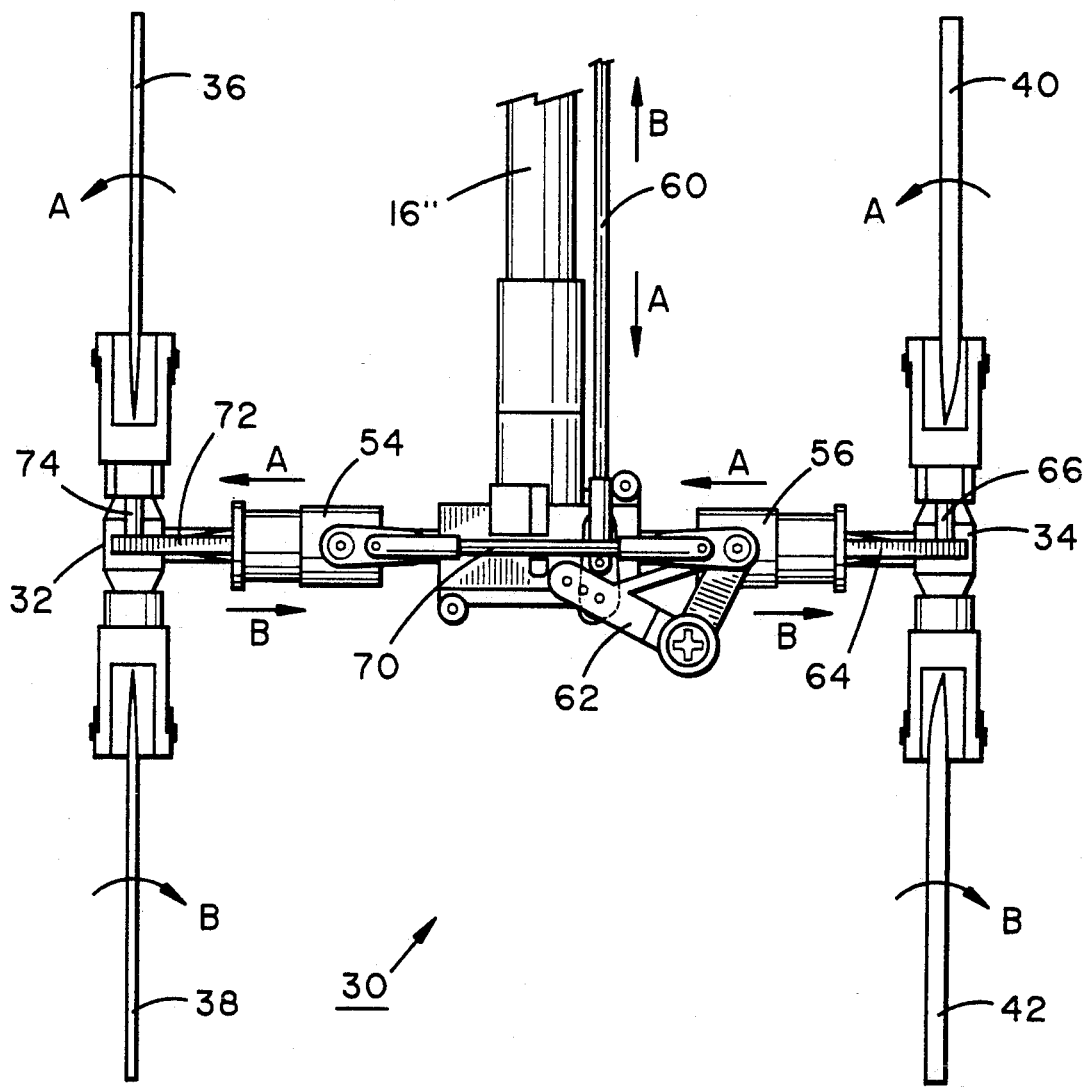
FIG. 5 is a fragmentary bottom plan view, looking up, of the tail rotor assembly of the present invention.

FIG. 5 illustrates in more detail the construction of pitch changing mechanisms 54 and 56. Pitch changing mechanism 56 is the same as is employed for conventional single tail rotors and is operatively connected to a pitch control rod 60 through a bell crank 62 and to rotor 34 through a link 64 which is rotatably attached to a post 66 on the rotor. A connecting rod 70 is rotatably attached to pitch changing mechanisms 54 and 56 so that the pitch changing mechanisms move simultaneously back and forth along shaft 50 to change the pitches of rotors 32 and 34 in unison. Pitch changing mechanism 54 includes a link 72 which is rotatably attached to a post 74 on rotor 32. So arranged, axial motion of pitch control rod 60 in the "A" or "B" directions will cause motion of the other moving elements on FIG. 5 in the "A" or "B" directions, respectively.

The relative pitches of tail rotors 32 and 34 are arranged so that, at hover, one of rotors 32 and 34 will be set at neutral pitch (FIG. 4) and the other will be set at a positive pitch, which one is neutral depending on the relative directions of rotation of the main rotor and the tail rotors.

The primary benefit derived from tail rotor assembly 30 is that it is balanced, i.e., there is a rotor on either side of tail boom 16". Consequently there is no asymmetrical drag on either side of tail boom 16" and, when in forward flight, the trim does not change as air speed changes; therefore, no trim adjustment is required for changes in air speed. Control is thereby simplified.

Another advantage of rotor tail assembly 30 is that the rotor disk diameter can be shortened significantly because the required tail rotor area is divided between rotors 32 and 34. This difference can amount to least 25 percent and up to 45 percent smaller diameter. The reduction in diameter offers significant personnel safety advantages when on the ground and also reduces problems with ground clearance.

A further advantage of tail rotor assembly 30 is that rotors 32 and 34 create a "box kite" effect in forward flight which renders unnecessary the vertical fins which are almost always required on helicopters with conventional tail rotors. This effect is achieved because rotors 32 and 34 act as two vertical fins and the air flowing between the two vertical "fins" gives a very stable effect in left or right yawing. In cross wind conditions, the helicopter is less affected because of the smaller disk diameter.

Preventing pirouetting in wind is much easier because the twin rotor areas act as deterrents to pirouetting and, with rotors 32 and 34 changing pitch together between negative and positive, transition to or from side wind to or from tail wind or to or from front wind is much easier. Also much easier is hovering in cross wind, due to the absence of a tail fin—the rotors, in effect, bite into the cross wind, rather than presenting a flat, solid surface to the wind.

A further advantage of the present invention is in yawing from a hover. With a single tail rotor, the rotor has a positive pitch at hover. With a clockwise rotating main rotor, when it is desired to yaw to the left, the tail rotor pitch decreases and the counter-rotational torque takes over to yaw to the left. With the twin rotor arrangement, the neutral rotor is given some positive pitch to assist the counter-rotational torque. The result is a much more controllable and precise maneuver.

Overall, it has been found that a helicopter with tail rotor assembly 30 has vastly improved performance over a conventional helicopter with a single tail rotor, in terms of stability and maneuverability, and a helicopter equipped with the novel tail rotor assembly can even fly backwards with significantly more stability than can a helicopter with a single tail rotor.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A tail rotor assembly for a helicopter, comprising:
    (a) a first rotor disposed on a first side of the distal end of a tail boom of said helicopter and rotatable in a first geometric plane; and
    (b) a second rotor disposed on a second side of the distal end of said tail boom, said second rotor being rotatable in a second geometric plane.

2. A tail rotor assembly, as defined in claim 1, wherein said first and second geometric planes are parallel.

3. A tail rotor assembly, as defined in claim 1, wherein said the axes of rotation of said first and second rotors are coincident.

4. A tail rotor assembly, as defined in claim 3, wherein said first and second geometric planes are vertical.

5. A tail rotor assembly, as defined in claim 1, wherein said first and second rotors are mounted on a common rotatable shaft.

6. A tail rotor assembly, as defined in claim 5, wherein said first and second rotors are parallel.

7. A tail rotor assembly, as defined in claim 1, further comprising means to change the pitches of said first and second rotors in unison.

8. A tail rotor assembly, as defined in claim 1, wherein said tail rotor assembly includes no tail fin.

* * * * *

UNITED STATES PATENT AND TRADEMARK OFFICE
CERTIFICATE OF CORRECTION

PATENT NO.  : 5,269,654
DATED       : Dec. 14, 1993
INVENTOR(S) : Don Chapman

It is certified that error appears in the above-indentified patent and that said Letters Patent is hereby corrected as shown below:

Column 4, line 41, claim 1, should read as follows:

1.        A tail rotor assembly for a helicopter, comprising:

(a) a first rotor disposed on a first side of the distal end of a tail boom of said helicopter and rotatable in a first geometric plane; [and]

(b) a second rotor disposed on a second side of the distal end of said tail boom, said second rotor being rotatable in a second geometric plane; and

UNITED STATES PATENT AND TRADEMARK OFFICE
CERTIFICATE OF CORRECTION

PATENT NO. : 5,269,654
DATED : Dec. 14, 1993
INVENTOR(S) : Don Chapman

It is certified that error appears in the above-indentified patent and that said Letters Patent is hereby corrected as shown below:

<u>(c) wherein the relative pitches of said first and second rotors are such that, when one of said first and second rotors is at neutral pitch, the other of said first and second rotors is at a positive pitch.</u>

Signed and Sealed this

Fifteenth Day of November, 1994

Attest:

BRUCE LEHMAN

Attesting Officer          Commissioner of Patents and Trademarks